(12) United States Patent
Yuan et al.

(10) Patent No.: US 12,506,524 B2
(45) Date of Patent: Dec. 23, 2025

(54) SYSTEM AND METHOD FOR USER EQUIPMENT ASSISTED OVER-THE-AIR CALIBRATION

(71) Applicant: Samsung Electronics Co., Ltd., Suwon-si (KR)

(72) Inventors: Jin Yuan, Plano, TX (US); Yu Liu, Allen, TX (US); Junmo Sung, Allen, TX (US); Gang Xu, Allen, TX (US); Jianzhong Zhang, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 613 days.

(21) Appl. No.: 17/823,491

(22) Filed: Aug. 30, 2022

(65) Prior Publication Data

US 2023/0067500 A1 Mar. 2, 2023

Related U.S. Application Data

(60) Provisional application No. 63/240,247, filed on Sep. 2, 2021.

(51) Int. Cl.
| | |
|---|---|
| *H04B 7/06* | (2006.01) |
| *H04B 7/0417* | (2017.01) |
| *H04B 17/11* | (2015.01) |
| *H04W 72/21* | (2023.01) |

(52) U.S. Cl.
CPC ......... *H04B 7/0626* (2013.01); *H04B 7/0417* (2013.01); *H04B 17/11* (2015.01); *H04W 72/21* (2023.01)

(58) Field of Classification Search
None
See application file for complete search history.

(56) References Cited

U.S. PATENT DOCUMENTS

| | | | |
|---|---|---|---|
| 10,164,720 B2 | 12/2018 | Rong et al. | |
| 10,484,212 B2 | 11/2019 | Yoo et al. | |
| 10,644,812 B2 | 5/2020 | Yoo et al. | |
| 10,848,209 B2 | 11/2020 | Yang et al. | |
| 11,108,442 B1* | 8/2021 | Tian | H04B 17/12 |
| 2012/0314563 A1* | 12/2012 | Luo | H04L 25/0212 370/216 |
| 2017/0093506 A1* | 3/2017 | Miao | H04B 17/21 |
| 2017/0134105 A1* | 5/2017 | Miao | H04B 17/12 |
| 2018/0097667 A1* | 4/2018 | Yoo | H04B 17/30 |
| 2018/0254839 A1* | 9/2018 | Yuan | H04B 7/046 |
| 2018/0279311 A1* | 9/2018 | Yoo | H04W 8/245 |
| 2019/0363853 A1 | 11/2019 | Soriaga et al. | |
| 2020/0052757 A1* | 2/2020 | Wang | H04W 24/02 |
| 2020/0076483 A1* | 3/2020 | Zhang | H04L 25/021 |

(Continued)

*Primary Examiner* — Bob A Phunkulh

(57) ABSTRACT

A method includes receiving, by a base station, a sounding reference signal (SRS) symbol from a user equipment (UE). The method also includes estimating, by the base station, an uplink (UL) channel from the UE to a full dimensional multiple-input multiple-output (FD-MIMO) base station base band based on the received SRS symbol. The method also includes receiving, by the base station from the UE, an estimate of a downlink (DL) channel from the FD-MIMO base station base band to the UE. The method also includes performing, by the base station, a joint calibration by applying one or more calibration algorithms using channel state information (CSI) of the UL channel and the DL channel.

20 Claims, 16 Drawing Sheets

(56) References Cited

U.S. PATENT DOCUMENTS

| | | | |
|---|---|---|---|
| 2020/0112350 A1* | 4/2020 | Yang | H04B 7/0421 |
| 2020/0119786 A1* | 4/2020 | Tan | H04B 7/0486 |
| 2021/0400513 A1* | 12/2021 | Raghavan | H04B 17/21 |
| 2021/0400582 A1* | 12/2021 | Raghavan | H04W 52/244 |

* cited by examiner

SYSTEM AND METHOD FOR USER EQUIPMENT ASSISTED OVER-THE-AIR CALIBRATION

CROSS-REFERENCE TO RELATED APPLICATIONS AND CLAIM OF PRIORITY

The present application claims priority to U.S. Provisional Patent Application No. 63/240,247, filed on Sep. 2, 2021. The content of the above-identified patent document is incorporated herein by reference.

TECHNICAL FIELD

The present disclosure relates generally to wireless communication systems and, more specifically, the present disclosure relates to a system and method for user equipment (UE) assisted over-the-air calibration.

BACKGROUND

Massive multi-input multi-output (MIMO) has shown a significant increase in system capacity as well as spectral efficiency by exploiting a large number of antennas. Full-dimension MIMO (FD-MIMO) technology was adopted in 3GPP Release-13 in cellular systems, to address the capacity and coverage issues in the practical cellular wireless communications. Extensive simulations and practical deployments of FD-MIMO show 2-4 times capacity gain compared with current LTE systems. Furthermore, FD-MIMO has been identified as one of the key 5G technologies and is being continuously improved in 3GPP new radio standards.

SUMMARY

The present disclosure relates to wireless communication systems and, more specifically, to a system and method for UE assisted over-the-air calibration.

In one embodiment, a method includes receiving, by a base station, a sounding reference signal (SRS) symbol from a user equipment (UE). The method also includes estimating, by the base station, an uplink (UL) channel from the UE to a full dimensional multiple-input multiple-output (FD-MIMO) base station base band based on the received SRS symbol. The method also includes receiving, by the base station from the UE, an estimate of a downlink (DL) channel from the FD-MIMO base station base band to the UE. The method also includes performing, by the base station, a joint calibration by applying one or more calibration algorithms using channel state information (CSI) of the UL channel and the DL channel.

In another embodiment, a device includes a memory configured to store instructions. The device also includes a processor operably connected to the memory. The processor is configured when executing the instructions to: receive a SRS symbol from a UE; estimate an UL channel from the UE to a FD-MIMO base station base band based on the received SRS symbol; receive, from the UE, an estimate of a DL channel from the FD-MIMO base station base band to the UE; and perform a joint calibration by applying one or more calibration algorithms using CSI of the UL channel and the DL channel.

In yet another embodiment, a non-transitory computer readable medium includes a plurality of instructions. The plurality of instructions, when executed by at least one processor, is configured to cause the at least one processor to: receive a SRS symbol from a UE; estimate an UL channel from the UE to a FD-MIMO base station base band based on the received SRS symbol; receive, from the UE, an estimate of a DL channel from the FD-MIMO base station base band to the UE; and perform a joint calibration by applying one or more calibration algorithms using CSI of the UL channel and the DL channel.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
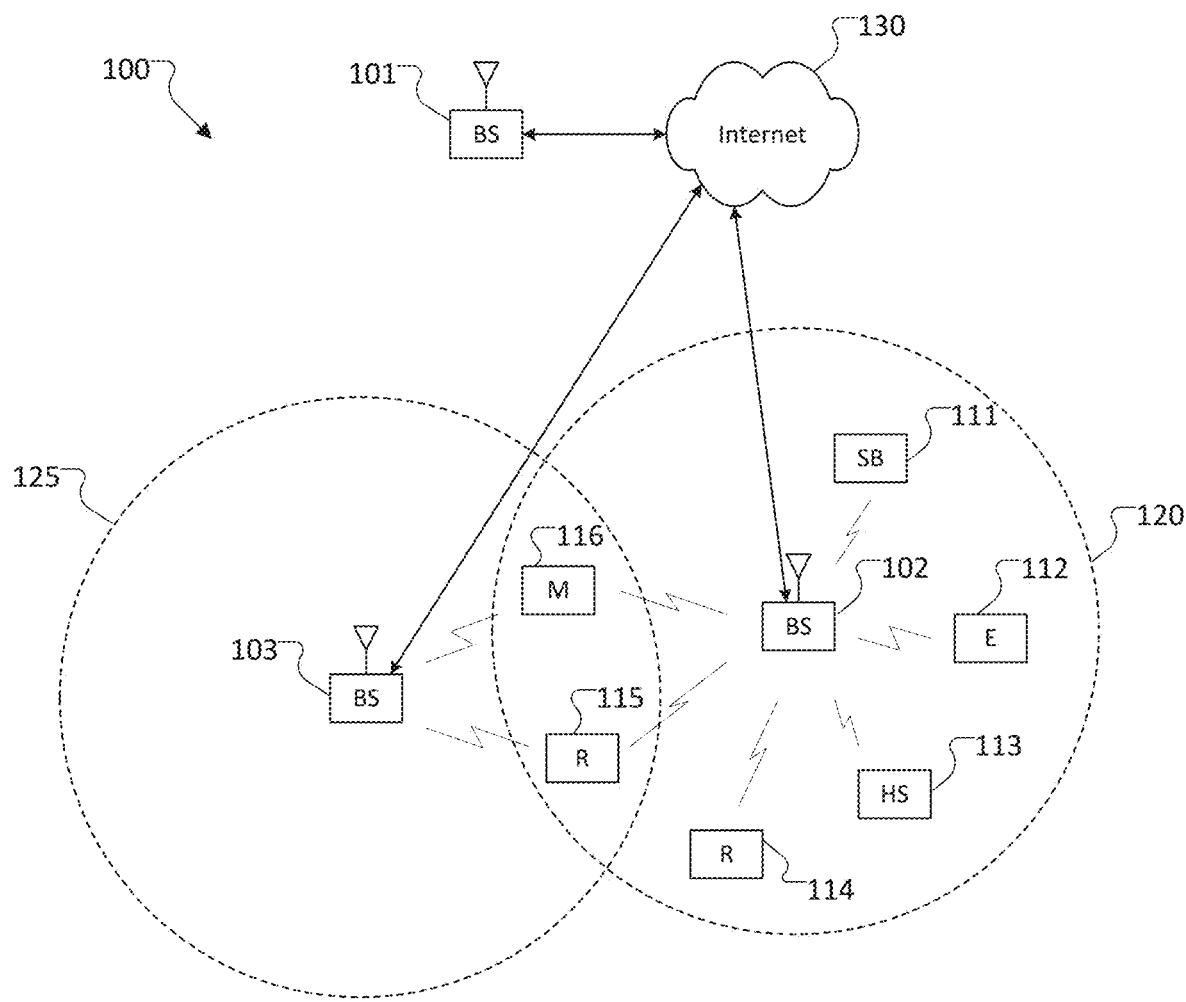
FIG. 1 illustrates an example wireless network according to embodiments of the present disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The present disclosure covers several components which can be used in conjunction or in combination with one another, or can operate as standalone schemes.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-4B are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP new radio interface/access (NR), LTE, LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof for UE assisted over-the-air calibration. In certain embodiments, and one or more of the gNBs 101-103 includes circuitry, programming, or a combination thereof for UE assisted over-the-air calibration.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

Figure 2:
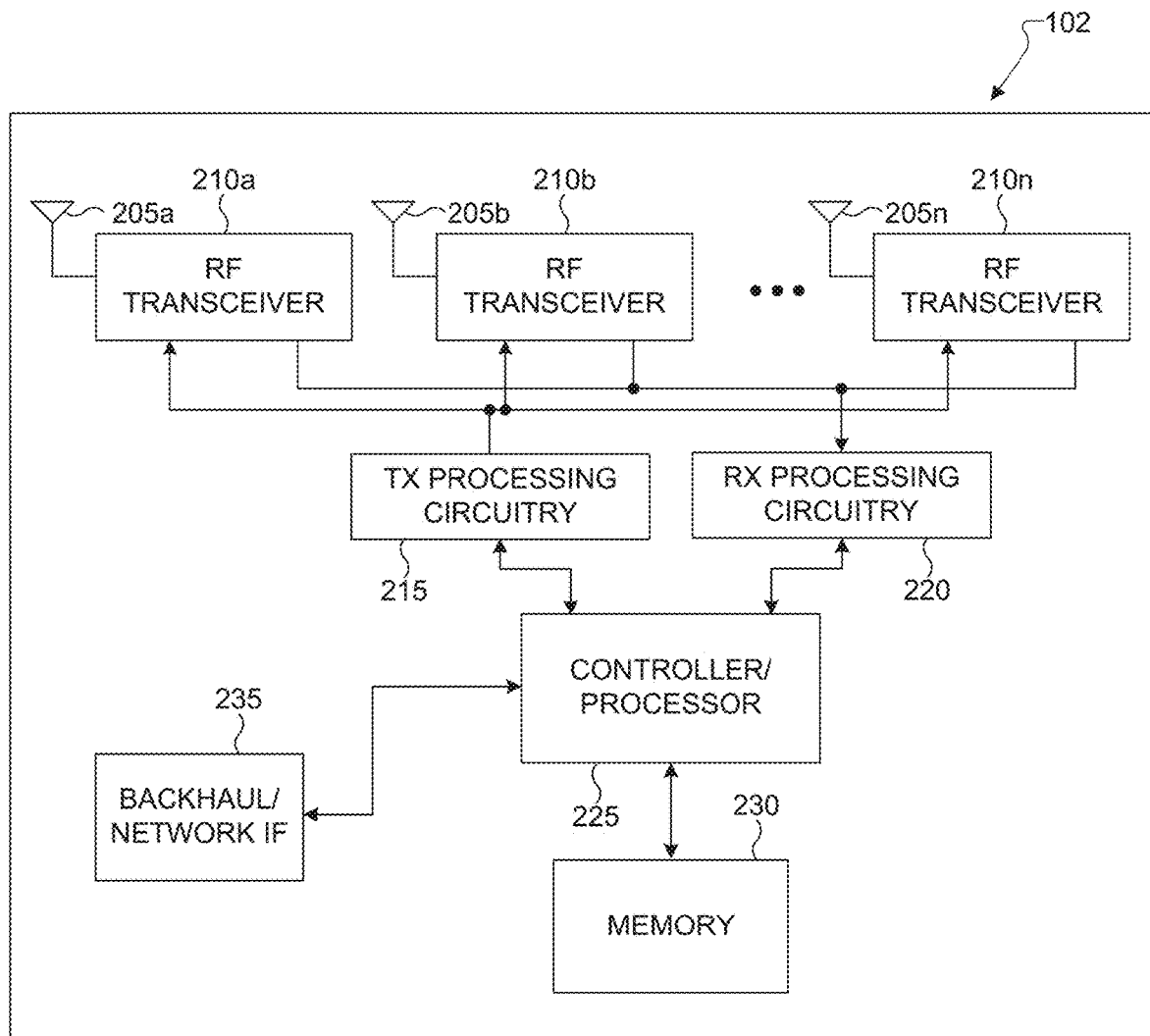
FIG. 2 illustrates an example gNB according to embodiments of the present disclosure.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support methods for UE assisted over-the-air calibration. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

Figure 3:
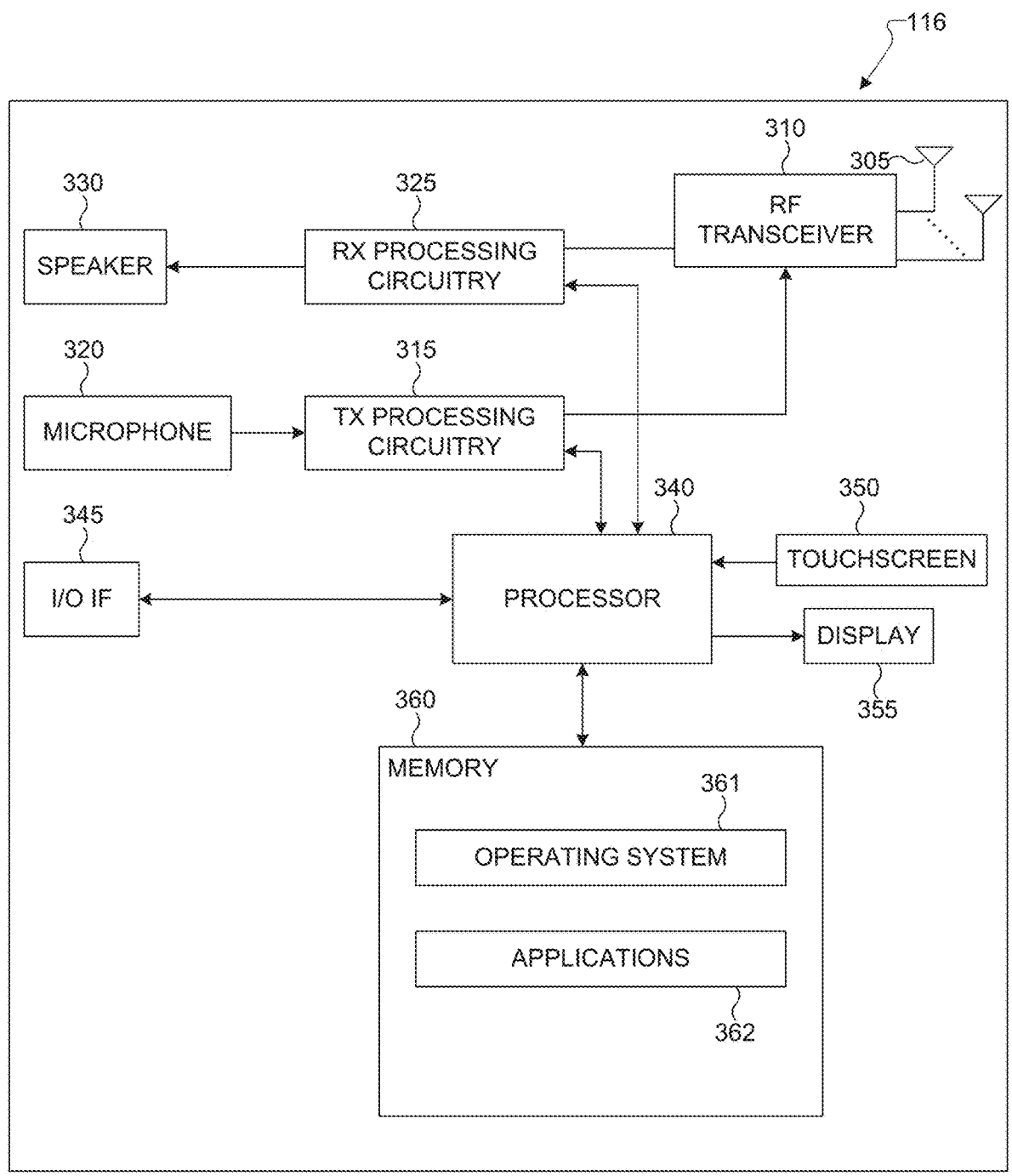
FIG. 3 illustrates an example UE according to embodiments of the present disclosure.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and RX processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for UE assisted over-the-air calibration. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
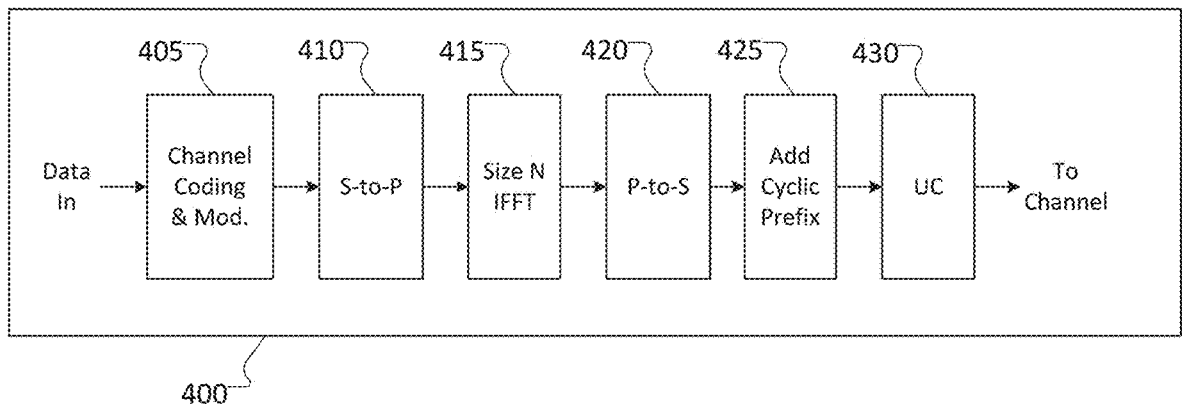
FIG. 4A illustrates a high-level diagram of an orthogonal frequency division multiple access transmit path according to embodiments of the present disclosure.
Figure 4B:
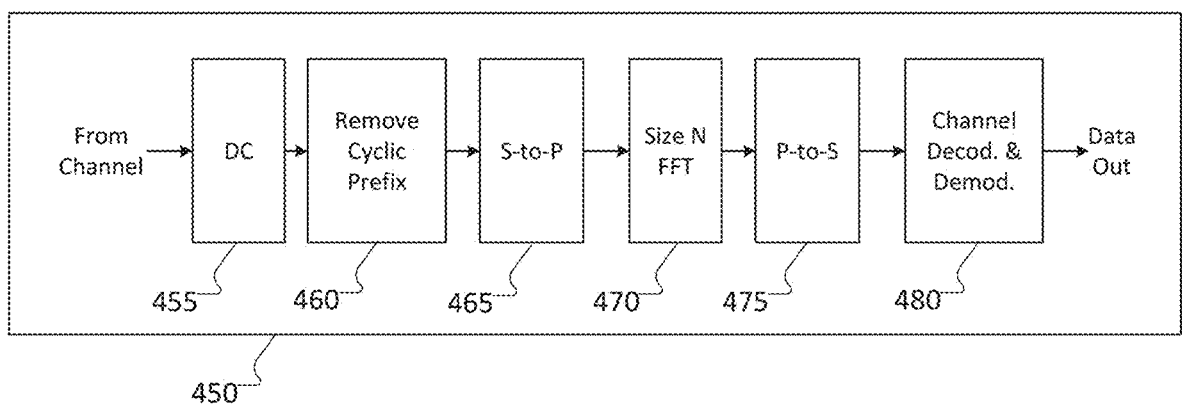
FIG. 4B illustrates a high-level diagram of an orthogonal frequency division multiple access receive path according to embodiments of the present disclosure.

FIG. 4A illustrates a high-level diagram of an orthogonal frequency division multiple access (OFDMA) transmit path 400 according to embodiments of the present disclosure. FIG. 4B illustrates a high-level diagram of an OFDMA receive path 450 according to embodiments of the present disclosure. In FIGS. 4A and 4B, for downlink communication, the transmit path 400 may be implemented in a base station (gNB) 102 or a relay station, and the receive path 450 may be implemented in a user equipment (e.g., user equipment 116 of FIG. 1). In other examples, for uplink communication, the receive path 450 may be implemented in a base station (e.g., gNB 102 of FIG. 1) or a relay station, and the transmit path 400 may be implemented in a user equipment (e.g., user equipment 116 of FIG. 1).

The transmit path 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. The receive path 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A and 4B may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In the transmit path 400, the channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. The serial-to-parallel block 410 converts (i.e., de-multiplexes) the serial modulated symbols to parallel data to produce N parallel symbol streams where N is the IFFT/FFT size used in the BS 102 and the UE 116. The Size N IFFT block 415 then performs an IFFT operation on the N parallel symbol streams to produce time-domain output signals. The parallel-to-serial block 420 converts (i.e., multiplexes) the parallel time-domain output symbols from the Size N IFFT block 415 to produce a serial time-domain signal. The add cyclic prefix block 425 then inserts a cyclic prefix to the time-domain signal. Finally, the up-converter 430 modulates (i.e., up-converts) the output of the add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at the gNB 102 are performed. The down-converter 455 down-converts the received signal to baseband frequency, and the remove cyclic prefix block 460 removes the cyclic prefix to produce the serial time-domain baseband signal. The serial-to-parallel block 465 converts the time-domain baseband signal to parallel time-domain signals. The Size N FFT block 470 then performs an FFT algorithm to produce N parallel frequency-domain signals. The parallel-to-serial block 475 converts the parallel frequency-domain signals to a sequence of modulated data symbols. The channel decoding and demodulation block 480 demodulates and then decodes the modulated symbols to recover the original input data stream.

Each of gNBs 101-103 may implement a transmit path that is analogous to transmitting in the downlink to the UEs 111-116 and may implement a receive path that is analogous to receiving in the uplink from the UEs 111-116. Similarly, each one of the UEs 111-116 may implement a transmit path corresponding to the architecture for transmitting in the uplink to the gNBs 101-103 and may implement a receive path corresponding to the architecture for receiving in the downlink from the gNBs 101-103.

Figure 5:
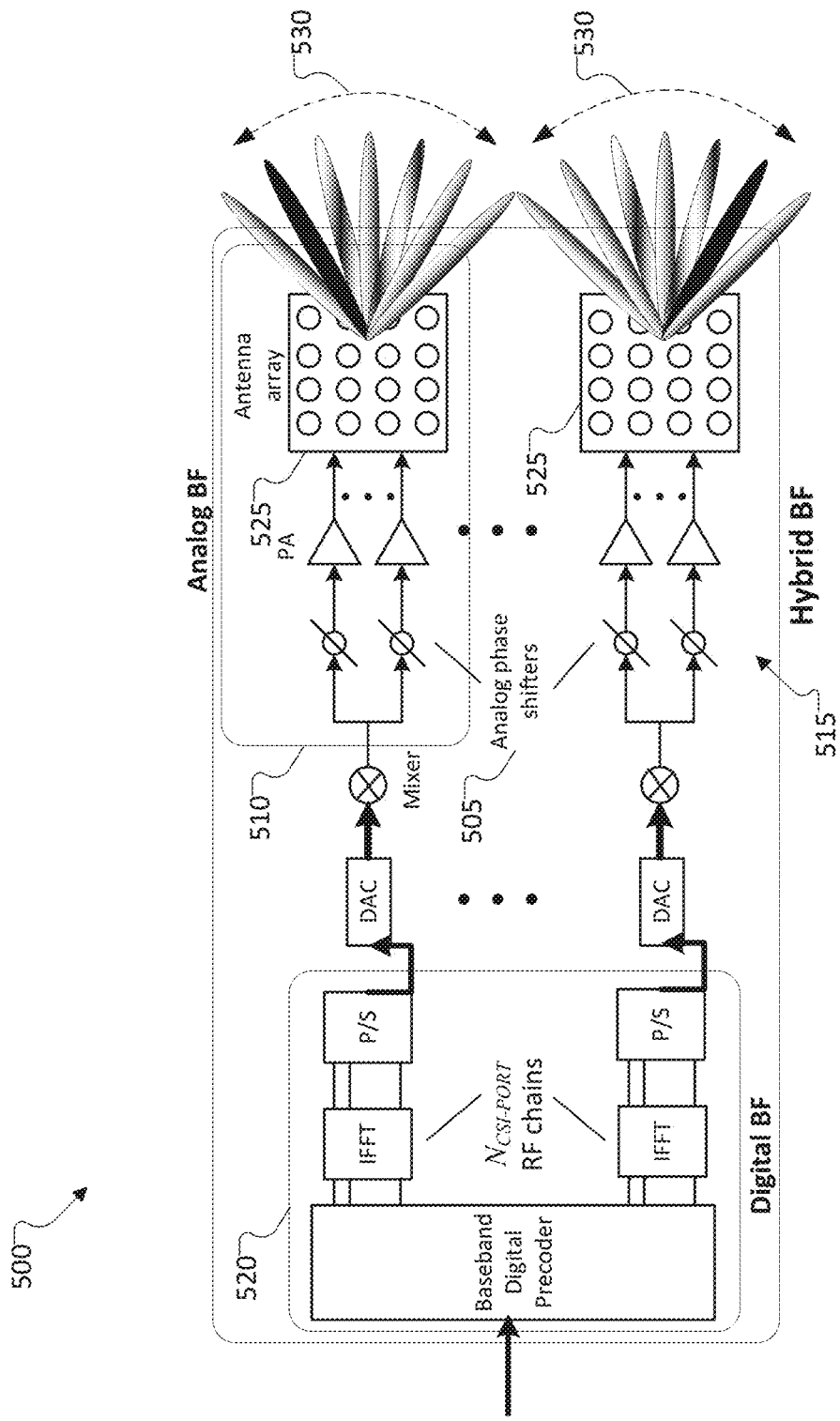
FIG. 5 illustrates an example beamforming architecture according to embodiments of the present disclosure.

FIG. 5 illustrates an example beamforming architecture 500 according to embodiments of the present disclosure. The embodiment of the beamforming architecture 500 illustrated in FIG. 5 is for illustration only. FIG. 5 does not limit the scope of this disclosure to any particular implementation of the beamforming architecture 500. In certain embodiments, one or more of gNB 102 or UE 116 can include the beamforming architecture 500. For example, one or more of antenna 205 and its associated systems or antenna 305 and its associated systems can be configured the same as or similar to the beamforming architecture 500.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of analog-to-digital converts/digital-to-analog converts (ADCs/DACs at mmWave frequencies)).

In the example shown in FIG. 5, the beamforming architecture 500 includes analog phase shifters 505, an analog beamformer (BF) 510, a hybrid BF 515, a digital BF 520, and one or more antenna arrays 525. In this case, one CSI-RS port is mapped onto a large number of antenna elements in antenna arrays 525, which can be controlled by the bank of analog phase shifters 505. One CSI-RS port can then correspond to one sub-array which produces a narrow analog beam through analog beamforming by analogy BF 510. The analog beam can be configured to sweep 530 across a wider range of angles by varying the phase shifter bank 505 across symbols or subframes. The number of sub-arrays (equal to the number of RF chains) is the same as the number of CSI-RS ports NCSI-PORT. A digital BF 515 performs a linear combination across NCSI-PORT analog beams to further increase precoding gain. While analog beams are wideband (hence not frequency-selective), digital precoding can be varied across frequency sub-bands or resource blocks.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

Additionally, the beamforming architecture 500 is also applicable to higher frequency bands such as >52.6 GHz (also termed the FR4). In this case, the beamforming architecture 500 can employ only analog beams. Due to the O2 absorption loss around 60 GHz frequency (~10 decibels (dB) additional loss @100 m distance), larger number of and sharper analog beams (hence larger number of radiators in the array) will be needed to compensate for the additional path loss.

As discussed above, massive MIMO has shown a significant increase in system capacity as well as spectral efficiency by exploiting a large number of antennas. Additionally, in many parts of the world, significant portions of expansion in mobile wireless network capacity will continue due to expansions in the geographic coverage of wireless data networks. Technically and economically, this presents a different set of challenges for keeping and expanding coverage in LTE and 5G cellular communication systems. Some reasons for this include the fact that most of the LTE and 5G bands are at high frequencies, which have higher path loss and wider bandwidth, which has lower power spectrum density. Therefore cell edge users typically have to be allocated with smaller than full bandwidth of the spectrum in order to boost the signal-to-noise ratio (SNR) at the base station for better reception.

To achieve the improvement in coverage and system capacity in FD-MIMO, channel state information (CSI) has to be known at the base station side, to create the precoders for either enhancing the DL power or compressing the multiuser interference for the capacity increase. Therefore, most of the FD-MIMO applications are allocated as TDD (Time Division Duplex) bands, in which a single frequency band is assigned for both the downlink (DL) and uplink (UL) communications, and the time domain is divided into two time slots of fixed length, one for DL and the other for UL communications. TDD is a method of DL and UL multiplexing over a common signal path. As a result, the CSI of the DL channel is reciprocal to the CSI of UL channel, which is referred to as channel reciprocity. FD-MIMO exploits the channel reciprocity of the TDD by detecting and estimating the CSI in UL.

Figure 6:
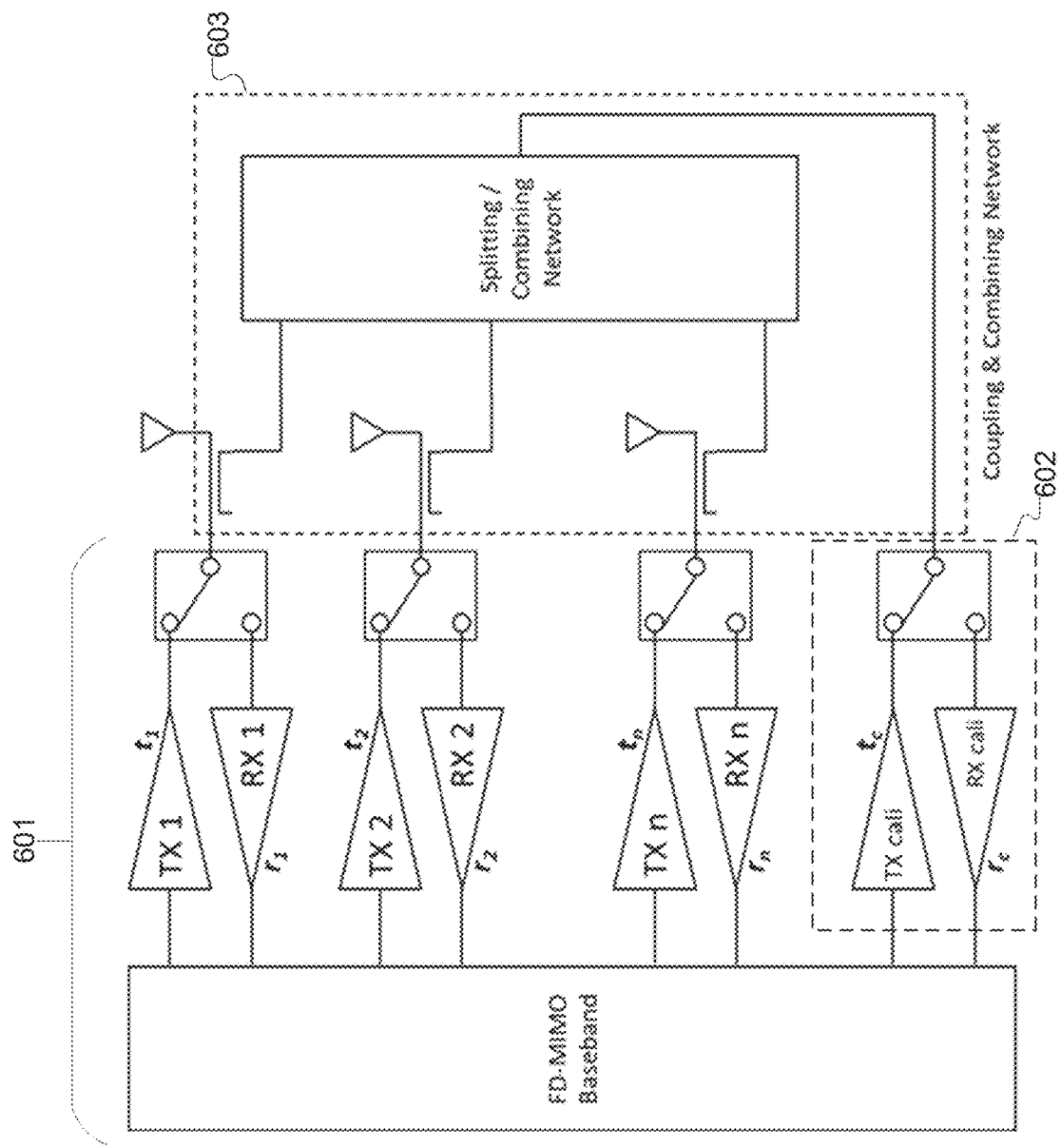
FIG. 6 illustrates a FD-MIMO RF front end that includes multiple TX circuits and RX circuits.

However, the multiple transmitters (TX) and receivers (RX) in FD-MIMO system may not follow the channel reciprocity property since the TX and RX circuits are not common for DL and UL. For example, FIG. 6 illustrates a FD-MIMO RF front end 601 that includes n TX circuits $(t_1-t_n)$ and n RX circuits $(r_1-r_n)$. However, for a given RF transceiver i, $t_i$ and $r_i$ may not be equal. Also, $t_i$ in multiple transmitters and $r_i$ in multiple receivers may not be equal due to component and PCB variance in each transceiver. To exploit reciprocity in practice, phase and amplitude mismatch in different TX and RX paths need to be calibrated and compensated. If the mismatch is not compensated properly, the 3D channel estimated based on sounding methods is not aligned with the actual downlink channel.

A conventional FD-MIMO system is equipped with one or more centralized calibration circuits to detect the phase and amplitude mismatch across the multiple TX and RX circuits. For example, FIG. 6 shows a conventional calibration block that includes a common TX and RX calibration channel 602 and a signal coupling, splitting and combining network 603, which connect to the multiple TX and RX circuits of the FD-MIMO RF front end 601.

Figure 7:
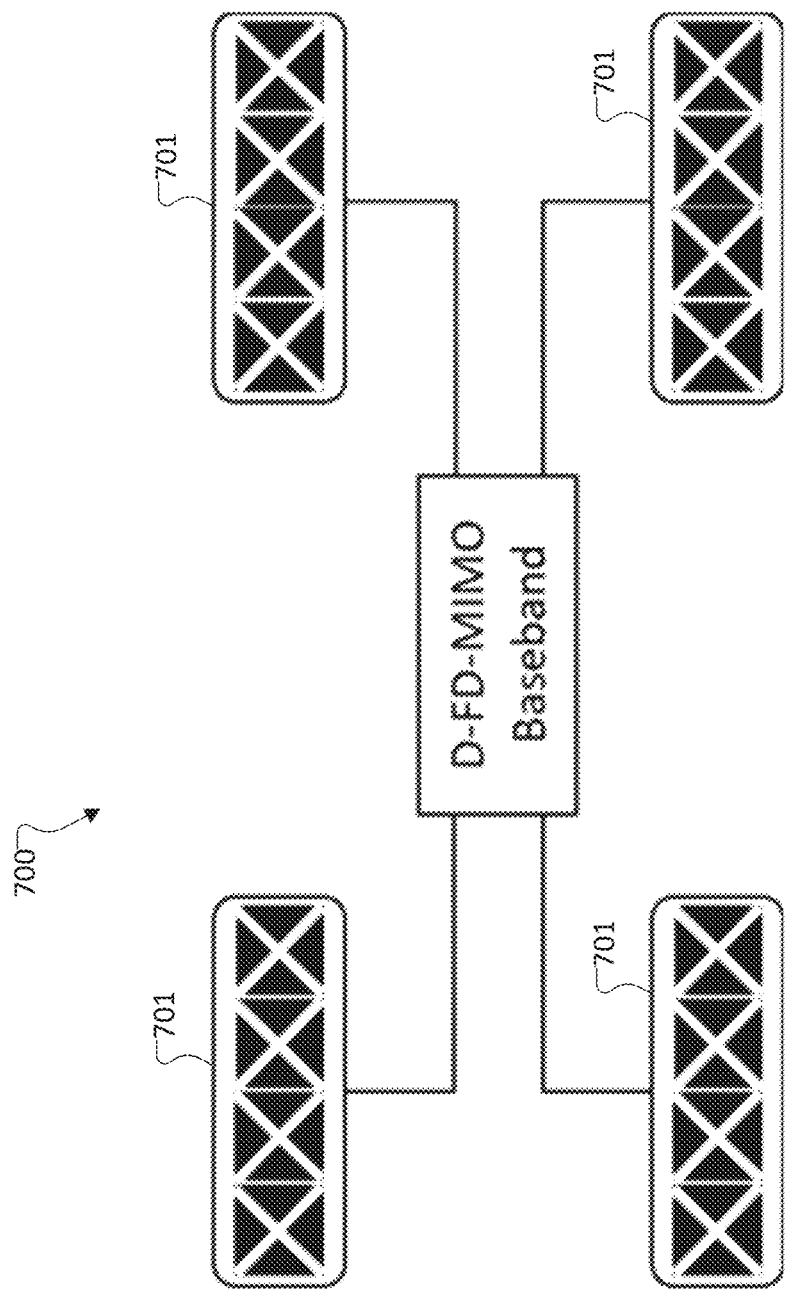
FIG. 7 illustrates an example implementation of distributed FD-MIMO.

Distributed FD-MIMO (D-FD-MIMO) is a multi-cell system, where each cell contains tens of distributed antenna elements performing multi-user MIMO (MU-MIMO). D-FD-MIMO has been shown to achieve not only higher system throughput, but also more uniform user experience compared to the conventional FD-MIMO. An example implementation of D-FD-MIMO is shown in FIG. 7, in which a large 32-TX/RX FD-MIMO system 700 breaks down into four radio frequency (RF) modules 701. Each RF module 701 has a much smaller size, and the RF modules 701 can be deployed far apart. A calibration operation may also be needed in the D-FD-MIMO system 700 to exploit the channel reciprocity. However, conventional centralized calibration techniques cannot be deployed in the D-FD-MIMO system 700 due to the physical separation of the multiple RF modules 701.

In a centralized calibration scheme, it is assumed that the channel response across the multiple paths are exactly the same. However, for FD-MIMO with a large number (>=32) of TX and RX circuits, design and manufacturing of the coupling and combining network with the same channel response is challenging. Experiments show that the phase mismatch across multiple paths in the coupling and combining network could be as large as a few tens of degrees. Calibration circuits with insufficient phase accuracy will result in significant residual errors and degrade beamforming performance. Furthermore, equipping a dedicated calibration circuit in the FD-MIMO base station increases the overall cost, size, weight, and power consumption. Designing such a centralized calibration circuit and integrating it to the whole equipment is also challenging. Moreover, as discussed above, centralized calibration cannot even be deployed in a D-FD-MIMO system due to the physical separation of the multiple RF modules.

To address these and other issues, this disclosure provides a system and method for UE assisted over-the-air calibration. As described in more detail below, the disclosed embodiments provide an innovate calibration operation without dedicated calibration circuits. By eliminating the dedicated calibration circuits in the design, the phase mismatch of multiple coupling and combining paths are not an issue. Also, without the calibration circuits, the overall cost, size, weight, and power consumption of the FD-MIMO system can be significantly reduced. The disclosed embodiments can also be applied in a D-FD-MIMO system without significant design change. Note that while some of the embodiments discussed below are described in the context of FD-MIMO systems, these are merely examples. It will be understood that the principles of this disclosure may be implemented in any number of other suitable contexts or systems.

Figure 8:
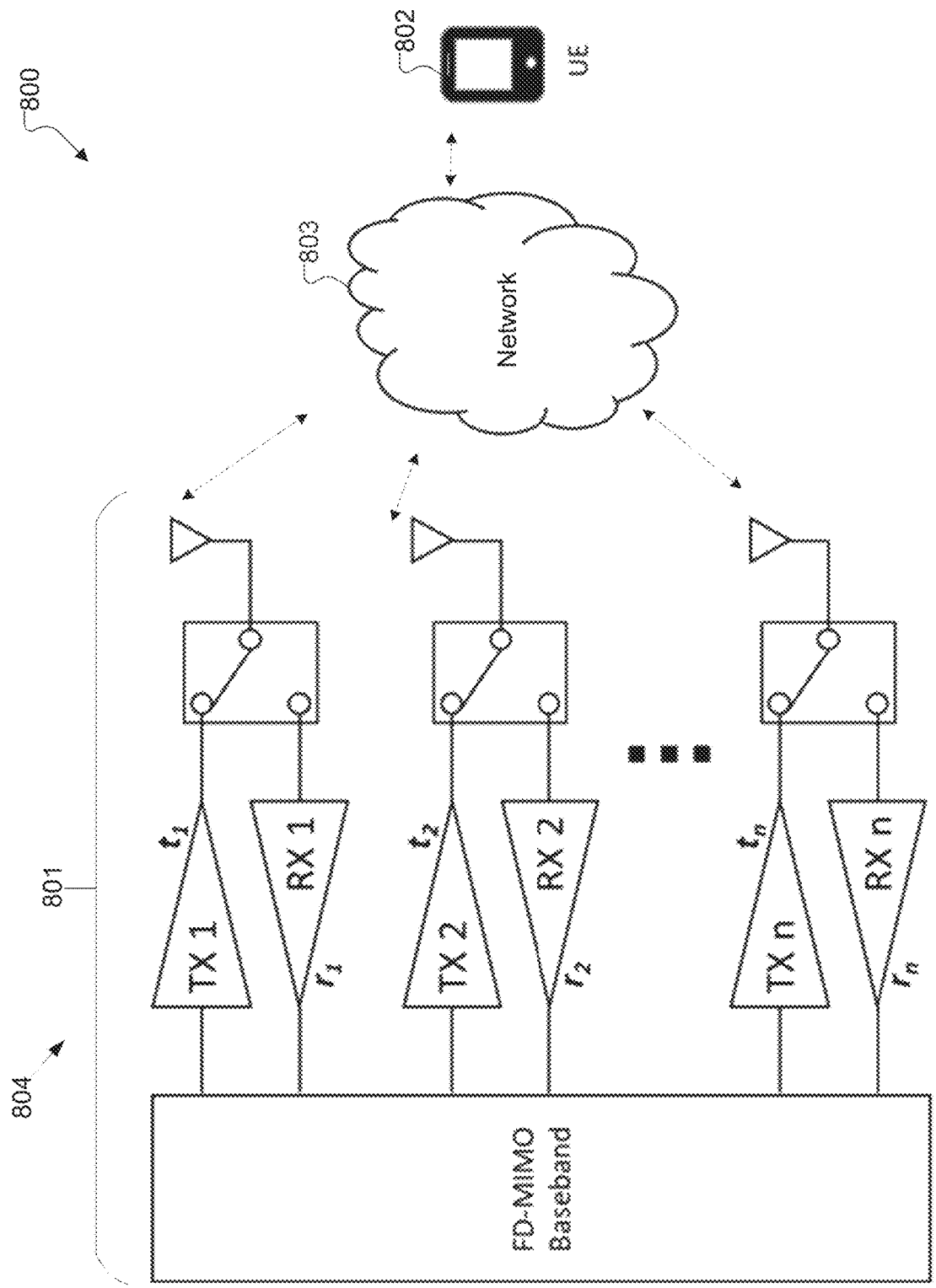
FIG. 8 illustrates an example system for UE assisted over-the-air (OTA) calibration according to embodiments of the present disclosure.

FIG. 8 illustrates an example system 800 for UE assisted over-the-air (OTA) calibration according to embodiments of the present disclosure. The embodiment of the system 800 shown in FIG. 8 is for illustration only. Other embodiments of the system 800 could be used without departing from the scope of this disclosure.

As shown in FIG. 8, the system 800 includes a FD-MIMO RF front end 801 and a UE 802 that communicate over a network 803. The UE 802 can represent (or be represented by) one or more of the UEs 111-116 of FIG. 1. The FD-MIMO RF front end 801 forms a portion of a base station 804 (e.g., the gNB 102) and includes n TX circuits $(t_1-t_n)$ and n RX circuits $(r_1-r_n)$, similar to the FD-MIMO RF front end 601 of FIG. 6. However, unlike the FD-MIMO RF front end 601, the TX and RX circuits of the FD-MIMO RF front end 801 are not connected to a dedicated TX and RX calibration channel and a signal coupling, splitting and combining network. That is, in the system 800, a signal coupling, splitting and combining network and a dedicated TX and RX calibration channel are not included. Instead, the system 800 utilizes the UE 802 to assist in OTA calibration.

As described in greater detail below, UE assisted OTA calibration includes two major steps: (i) uplink (UL) channel acquisition using a sounding reference signal (SRS), and (ii) downlink (DL) channel acquisition using a DL CSI reference signal (CSI-RS). In one aspect of operation, the UE 802 sends a UL SRS symbol to the base station 804. The base station 804 acquires the SRS symbol, from which the base station 804 estimates the UL channel all the way from the transmitter of the UE 802 to the FD-MIMO base station base band. In the meantime, the base station 804 transmits the CSI-RS symbol in the DL. The UE 802 acquires the CSI-RS symbol, and estimates the DL channel all the way from the FD-MIMO base station base band to the receiver of the UE 802. Then, the UE 802 transmits the estimated DL channel state information back to the base station 804. Examples of the CSI-RS symbol and SRS symbol are shown in FIG. 9.

Figure 9:
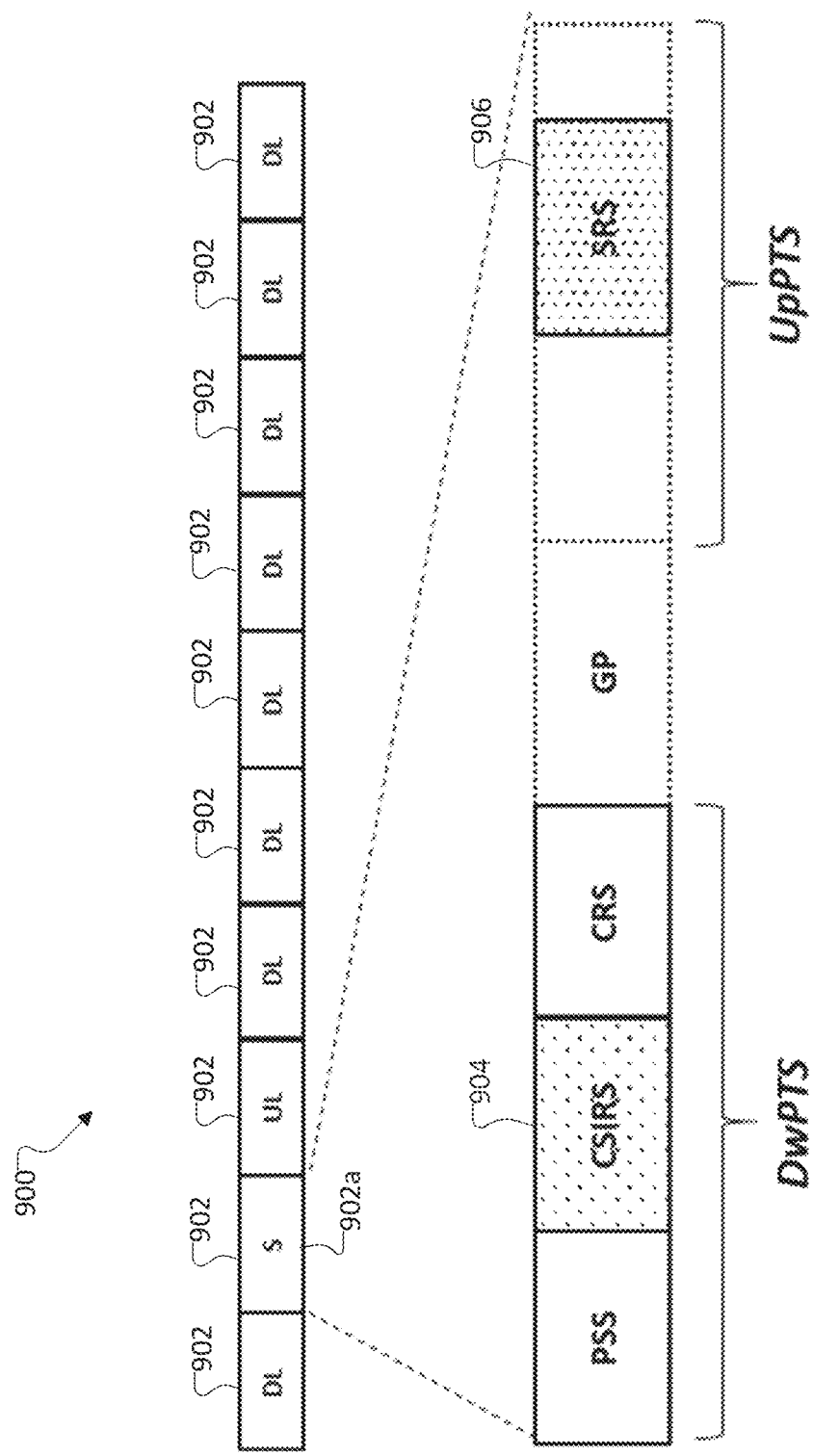
FIG. 9 illustrates a calibration frame that can be used for UE assisted OTA calibration according to embodiments of the present disclosure.

FIG. 9 illustrates a calibration frame 900 that can be used for UE assisted OTA calibration according to embodiments of the present disclosure. As shown in FIG. 9, the calibration frame 900 is an LTE compliant frame, such as a TDD LTE frame. The calibration frame 900 includes multiple subframes 902, including a special subframe 902a. In the special subframe 902a, the base station 804 transmits the CSI-RS symbol 904 in the DL and the UE 802 transmits the SRS symbol 906 in the UL. In some embodiments, all antennas of the FD-MIMO RF front end 801 receive the SRS symbol 906 sent by the UE 802.

The base station 804 can perform a joint calibration process by applying one or more calibration algorithms with both the DL and UL channel state information (e.g., the SRS and the CSI-RS). The joint calibration process computes a variation of one or more ratios between the TX channel and RX channel across the multiple transceivers of the FD-MIMO RF front end 801. An example of the joint calibration process is shown in FIG. 10, which includes SRS transmission and reception, CSI-RS transmission and reception, DL channel estimation feedback, and calibration computation.

Figure 10:
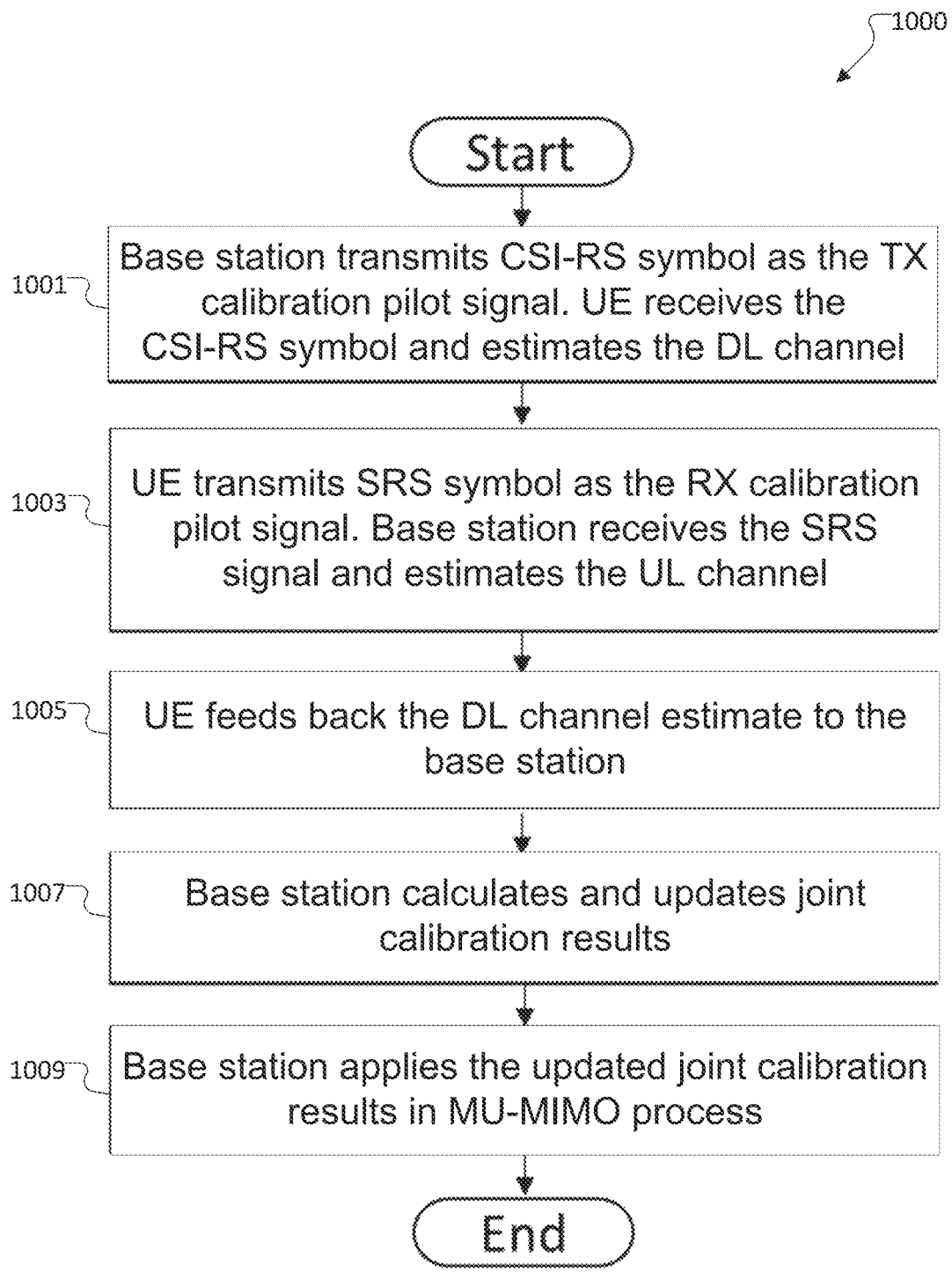
FIGS. 10 and 11 illustrate details of an example process for UE assisted OTA calibration according to embodiments of the present disclosure.
Figure 11:
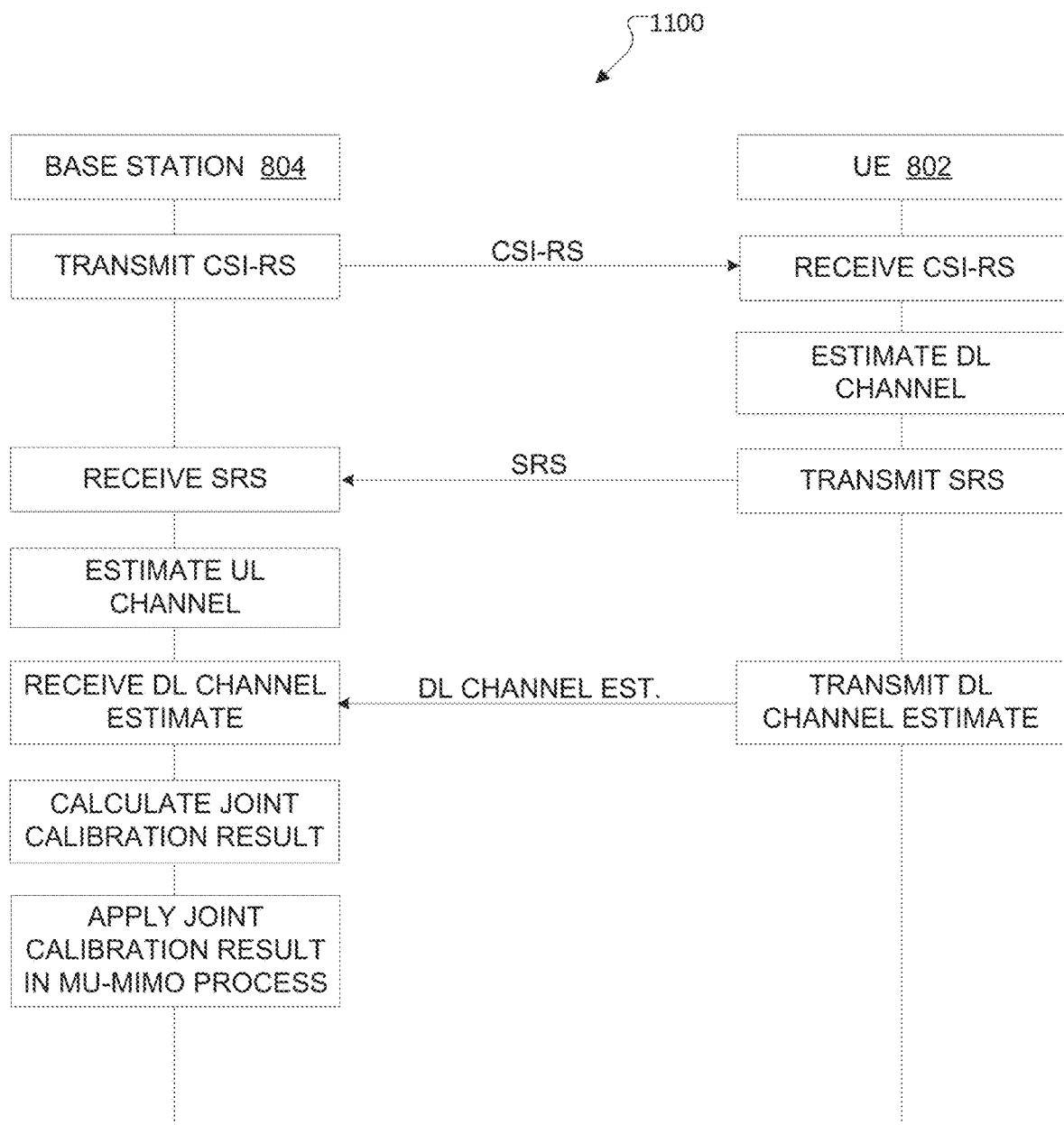

FIGS. 10 and 11 illustrate details of an example process 1000 for UE assisted over-the-air calibration according to embodiments of the present disclosure. Specifically, FIG. 10 illustrates a flowchart of the process 1000, and FIG. 11 illustrates a signaling diagram 1100 that corresponds to the process 1000. For ease of explanation, the process 1000 will be described as being performed using the system 800. The embodiment of the process 1000 shown in FIGS. 10 and 11 is for illustration only. Other embodiments of the process 1000 could be used without departing from the scope of this disclosure.

Figure 12:
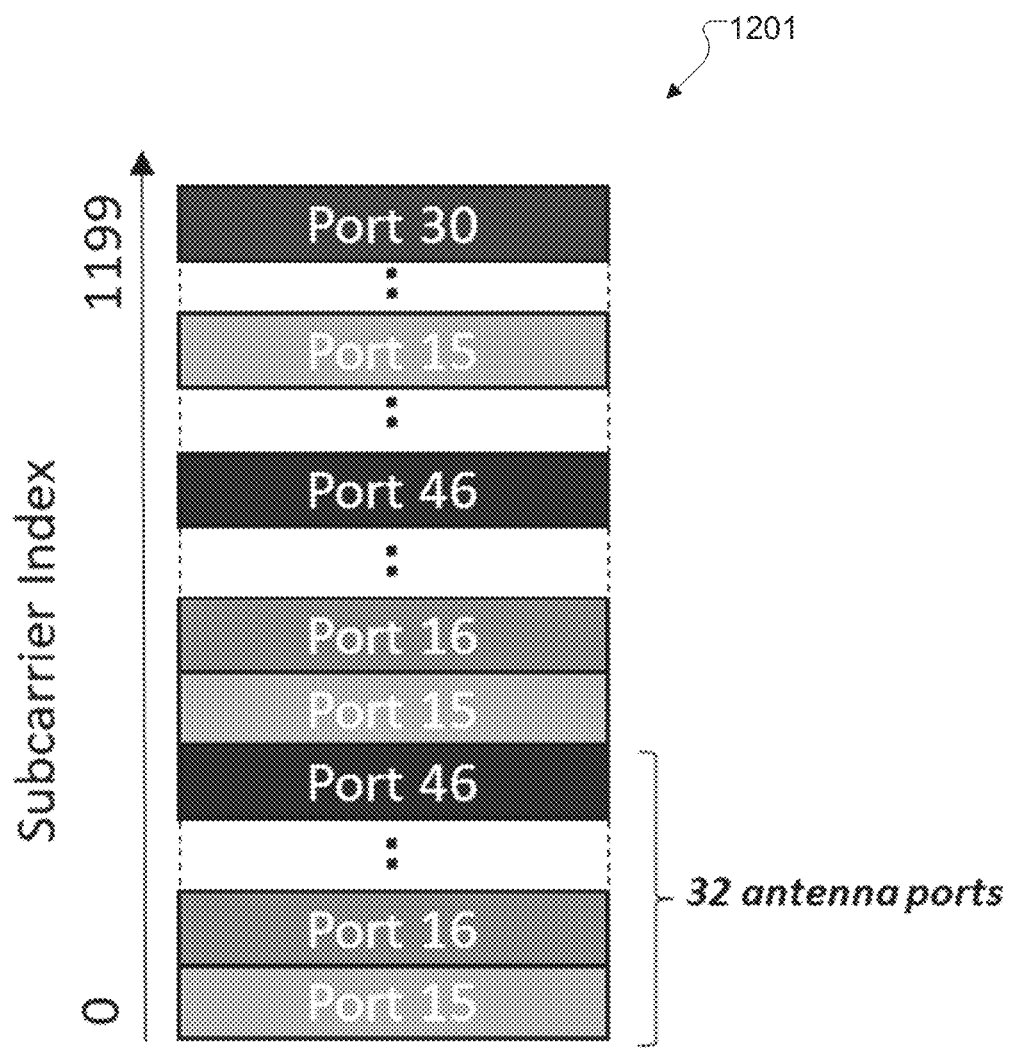
FIG. 12 illustrates an example CSI-RS symbol for use in the calibration process shown in FIGS. 10 and 11 according to embodiments of the present disclosure.

At operation 1001, the base station 804 transmits a CSI-RS symbol as a TX calibration pilot signal. The CSI-RS symbol can be transmitted in the special subframe 902a. In some embodiments, a specific CSI-RS symbol can be used to multiplex the signal sent by the multiple TX circuits. FIG. 12 illustrates an example CSI-RS symbol 1201 for use in the process 1000. As shown in FIG. 12, the CSI-RS symbol 1201 allocates 1200 subcarriers to 32 antenna ports (e.g., ports 15-46) in 20 MHz LTE. The design of the CSI-RS symbol 1201 accommodates the multiplexing of 32 TX circuits as well as 32 antennas. Starting from the subcarrier #0, the training sequences modulated onto each subcarrier are sent by the TX circuits one by one and repetitively from the first TX circuits to the 32nd TX circuits. That is, subcarrier #0 is assigned to antenna port #15, subcarrier #1 is assigned to antenna port #16, and subcarrier #31 is assigned to antenna port #46. This assignment is repeated until subcarrier #1199. Of course, the CSI-RS symbol 1201 shown in FIG. 12 is merely one example. Other CSI-RS symbol designs are possible and within the scope of this disclosure.

Turing again to FIGS. 10 and 11, the UE 802 receives the CSI-RS symbol and estimates the DL channel from the FD-MIMO base station base band to the receiver of the UE 802. Using the CSI-RS symbol 1201 as an example, the UE 802 estimates the DL channel state information in the 1200 subcarriers.

At operation 1003, the UE 802 transmits a SRS symbol as a RX calibration pilot signal. The SRS symbol can be transmitted in the special subframe 902a. The base station 804 receives the SRS symbol and estimates the UL channel from the transmitter of the UE 802 to the FD-MIMO base station base band.

At operation 1005, the UE 802 feeds the DL channel estimate back to the base station 804. Using the CSI-RS symbol 1201 as an example, the UE 802 can feed back 1200 raw channel coefficients to the base station 804.

At operation 1007, the base station 804 calculates and updates joint calibration results by applying one or more calibration algorithms using CSI of both the UL channel and the DL channel. In some embodiments, the base station 804 extracts the CSI associating each antenna port, and then reconstructs the whole channel state for the full band, which can include signal processing techniques such as interpolation, spectrum smoothing, and the like. In some embodiments, the calibration algorithms compute a variation of one or more ratios between a TX channel and a RX channel across the multiple transceivers of the FD-MIMO RF front end 801. In some embodiments, the calibration algorithms are based on a weighted least squares technique, as described below.

In the UE assisted OTA calibration disclosed herein, the OTA channel can experience significant fluctuation in magnitude as well as significant distortion in phase, compared to a conventional calibration scheme with dedicated coupling network and circuits. The significant fluctuation in the OTA channels is due to the multipath situation, and the phase distortion can be serious when the channel is with deep fading. On the other hand, the channel response of modern transceivers is assumed with linear phase, and linear fitting can be applied in the calibration process to mitigate the impact of noise. Accordingly a weighted least squares technique can be used to account for the magnitude fluctuation and phase distortion in the actual OTA channels due to fading.

In a conventional calibration algorithm, the phase frequency response of each TX or RX channel can be modeled as:

$$\psi_{ik} = 2\pi f_k \tau_i + \theta_i$$

where i and k are antenna and subcarrier indices, respectively, $\psi_{ik}$ is the phase at i channel and k subcarrier, and $\tau_i$ and $\theta_i$ are the i channel delay and initial phase, respectively. The model can be rewritten in matrix format as:

$$\psi_i = A b_i$$

where $\psi_i = [\psi_1, \psi_2, \ldots, \psi_K]^T$, $b_i = [\tau_i, \varphi_i]^T$ are the phase vector and the parameter vector, respectively, and the matrix A can be represented as:

$$A = \begin{bmatrix} 2\pi f_1 & \cdots & 2\pi f_K \\ 1 & \cdots & 1 \end{bmatrix}^T$$

The conventional calibration algorithm applies a least squares technique in estimating the channel parameters according to the following:

$$\check{b}_i = A^\dagger \tilde{\psi}_i$$

where $\tilde{\psi}_i$ is phase vector measurement.

In accordance with this disclosure, a weighted system model takes the channel power at each subcarrier as the weight, according to the following:

$$W\psi_i = W A b_i$$

where W is a diagonal weighting matrix. The matrix W can be expressed according to the following:

$$W = \mathrm{diag}(p_1, p_2, \ldots, p_K)$$

where $p_k$ is the over the air channel power at each subcarrier. Then the weighted least squares solution can be expressed as:

$$\check{b}_i = (WA)^\dagger W \tilde{\psi}_i.$$

Figure 13A:
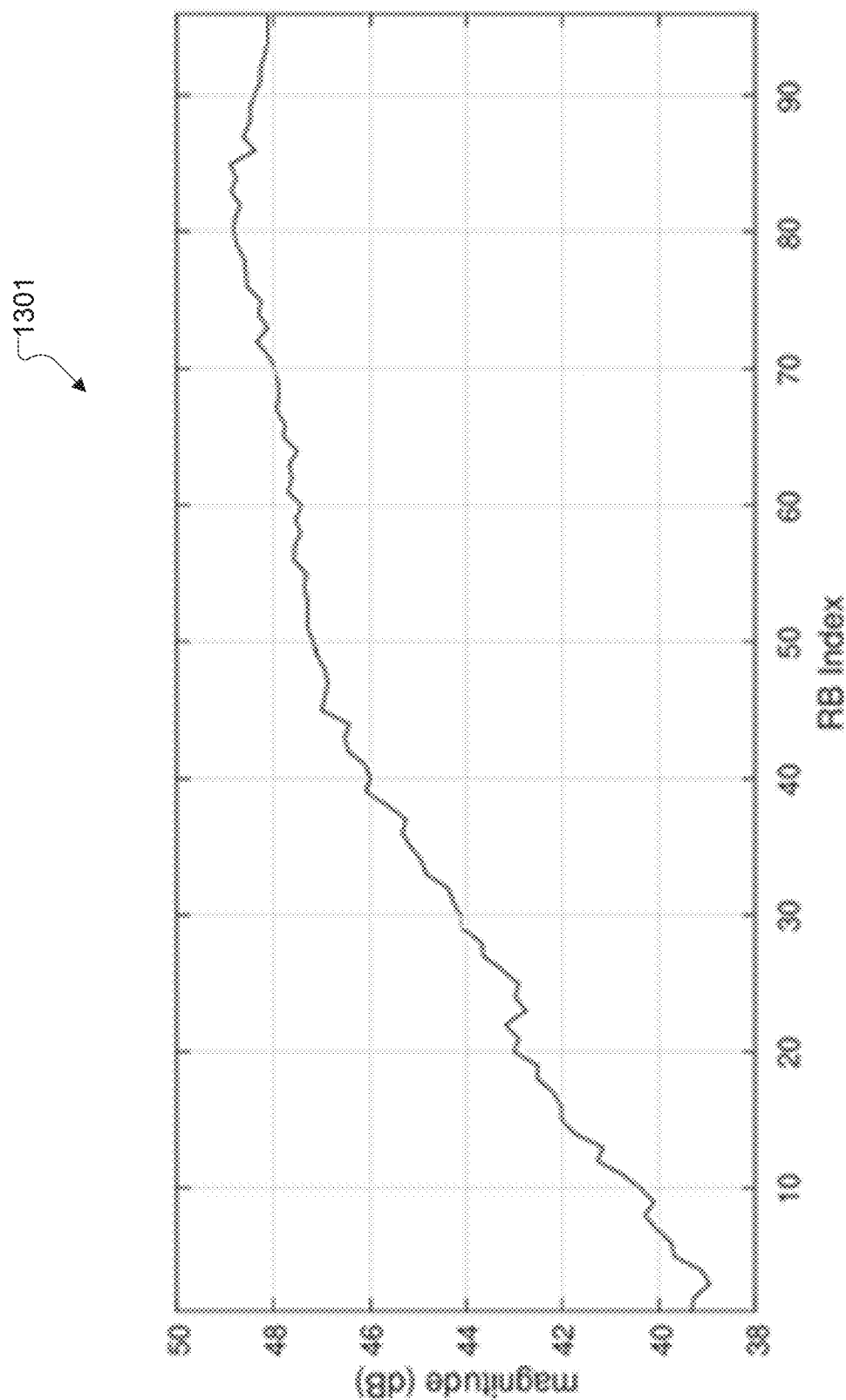
FIGS. 13A and 13B illustrate a comparison between a weighted least squares solution and a least squares technique used in a conventional calibration technique.
Figure 13B:
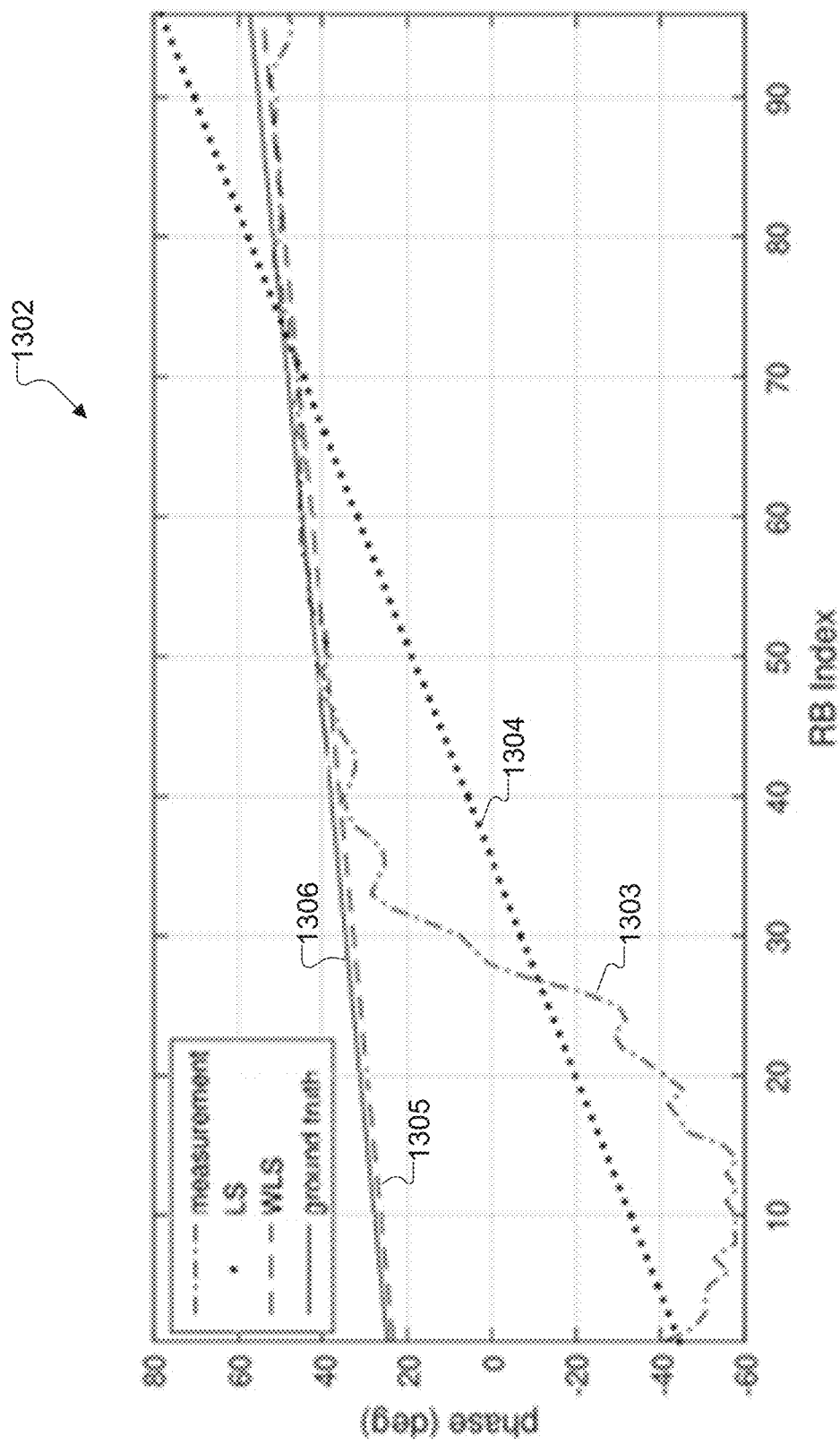

FIGS. 13A and 13B illustrate a comparison between the weighted least squares solution disclosed herein and least squares (LS) used in the conventional calibration technique in one RF channel. The chart 1301 of FIG. 13A shows the OTA channel power at each resource block (RB), which is of 180 kHz bandwidth. The chart 1302 of FIG. 13B shows the corresponding phase response. As indicated by the curve 1303, the OTA channel phase may exhibit large distortion when the channel magnitude is low. Linear fitting can be applied to the curve 1303 using either conventional LS or the weighted LS technique described herein. The curve 1304 represents linear fitting with the conventional LS. In contrast, the curve 1305 represents the linear fitting with the weighted LS technique. The variation between the weighted LS result and the ground truth (curve 1306) is within three degrees. Here, the ground truth is determined by connecting the antenna ports to a power splitter, which has identical flat channel magnitude and linear phase across channels. Thus, it can be seen that by applying the weighted LS, the calibration result is significantly better than by using a conventional LS technique.

Turning again to FIG. 10, at operation 1009, the base station 804 can apply the updated joint calibration results in a process, such as a MU-MIMO process.

Although FIGS. 8 through 13B illustrates examples of a system 800 and a process 1000 for UE assisted over-the-air calibration and related details, various changes may be made to FIGS. 8 through 13B. For example, while the UE 802 is shown as a typical mobile device, the UE 802 could include other types of common or dedicated device. Also, while the system 800 includes the FD-MIMO RF front end 801, other types of eNB components could be included, such as those for D-FD-MIMO, where centralized calibration is not available. Furthermore, various components in FIG. 8 could be combined, further subdivided, or omitted and additional components could be added according to particular needs. In addition, while shown as a series of steps, various steps in FIG. 10 could overlap, occur in parallel, occur in a different order, or occur any number of times.

Figure 14:
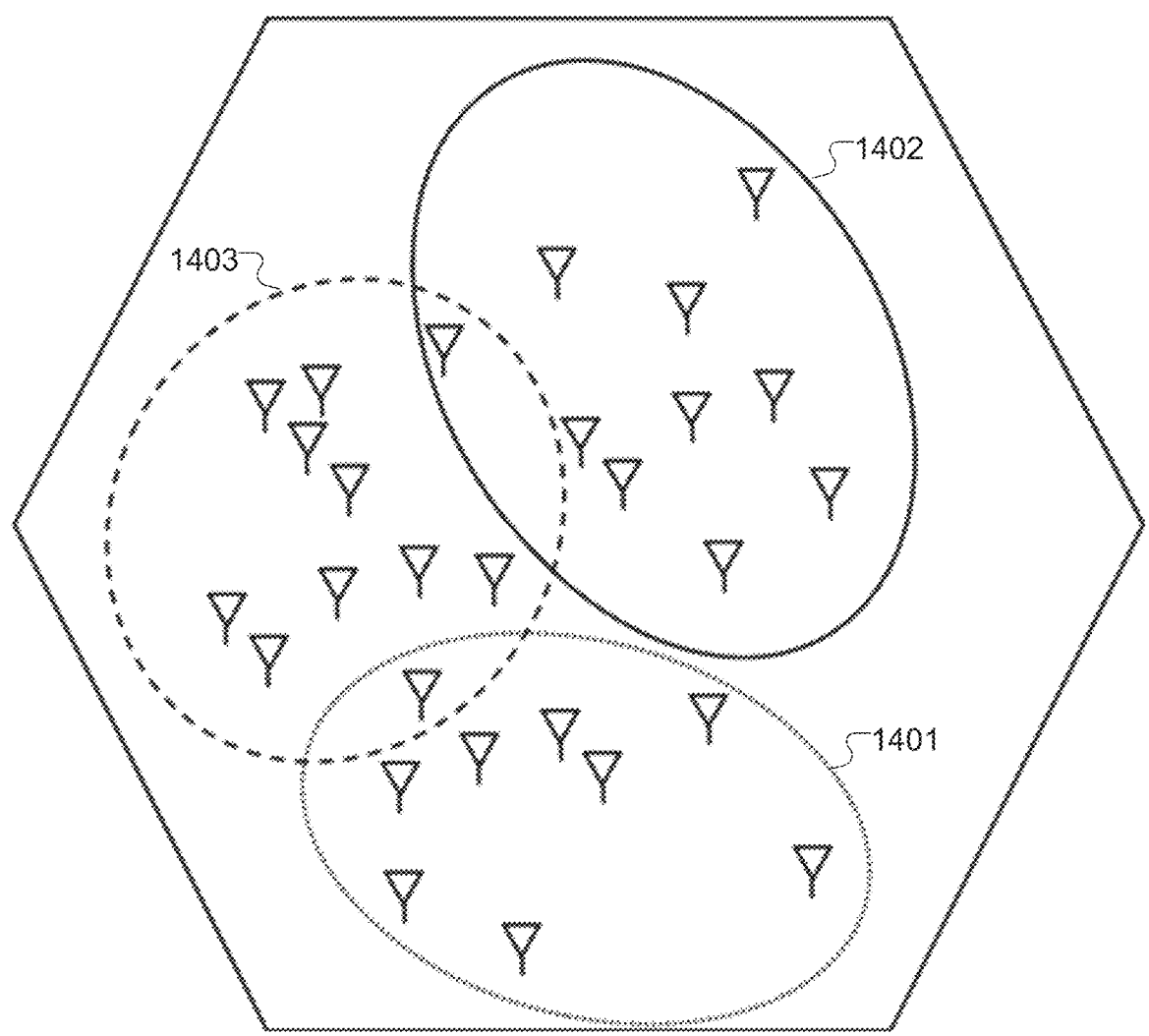
FIG. 14 illustrates a group based OTA calibration according to embodiments of the present disclosure.

As discussed above, integrated calibration using conventional techniques is not feasible for D-FD-MIMO system due to the large separation of multiple remote units (RUs). However, the OTA calibration techniques disclosed herein can be used for D-FD-MIMO. In a D-FD-MIMO system, the calibration signal is transmitted and received wirelessly by a target transceiver. Each RU antenna can serve as the target antenna due to the physically distributed RF circuits (especially PAs and LNAs). To deal with the NLoS scenario (NLoS between BS antennas), the calibration operation can be achieved by a group based OTA calibration strategy, in which antennas are grouped with at least one overlapping antenna, and the calibration is performed group by group. The group based OTA calibration is shown in FIG. 14, where the distributed antennas are grouped into three clusters 1401-1403 with overlapping antennas. The calibration can be performed three times, each for one cluster. And the full calibration could be constructed by those overlapping antennas.

Figure 15:
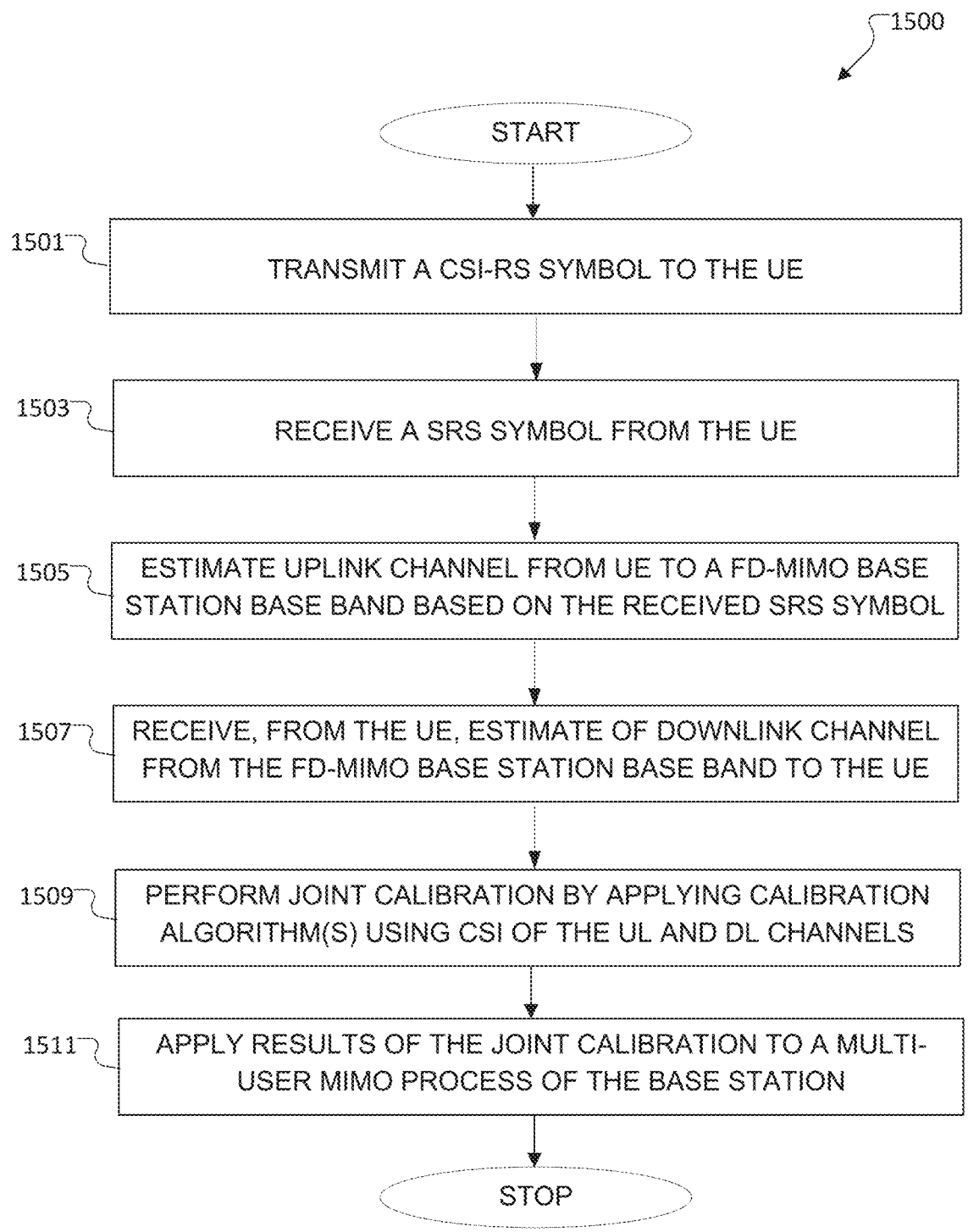
FIG. 15 illustrates a flow chart of a method for UE assisted OTA calibration according to embodiments of the present disclosure.

FIG. 15 illustrates a flow chart of a method 1500 for UE assisted OTA calibration according to embodiments of the present disclosure, as may be performed by a base station (e.g., the base station 804 as illustrated in FIG. 8). The embodiment of the method 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions.

As illustrated in FIG. 15, the method 1500 begins at step 1501. At step 1501, the base station transmits a CSI-RS symbol to the UE. This could include, for example, the base station 804 transmitting the CSI-RS symbol 904 to the UE 802 for the estimate of the DL channel, such as described in operation 1001 of FIG. 10.

At step 1503, the base station receives a SRS symbol from the UE. This could include, for example, the base station 804 receiving a SRS symbol 906 from the UE 802, such as described in operation 1003. In some embodiments, the CSI-RS symbol is transmitted and the SRS symbol is received in a single TDD frame, such as the calibration frame 900.

At step 1505, the base station estimates an UL channel from the UE to a FD-MIMO base station base band based on the received SRS symbol. This could include, for example, the base station 804 estimating the UL channel from the UE 802 to the FD-MIMO base station base band 801, such as described in operation 1003.

At step 1507, the base station receives, from the UE, an estimate of a DL channel from the FD-MIMO base station base band to the UE. This could include, for example, the base station 804 receiving, from the UE 802, an estimate of a DL channel from the FD-MIMO base station base band 801 to the UE 802, such as described in operation 1005.

At step 1509, the base station performs a joint calibration by applying one or more calibration algorithms using CSI of the UL channel and the DL channel. This could include, for example, the base station 804 performing the joint calibration by applying one or more calibration algorithms, such as described in operation 1007. In some embodiments, the one or more calibration algorithms compute a variation of one or more ratios between a transmit channel and a receive channel across multiple transceivers of the base station. In some embodiments, the one or more calibration algorithms comprise a weighted least squares algorithm.

At step 1511, the base station applies results of the joint calibration to a multi-user MIMO process. This could include, for example, the base station 804 applying the results of the joint calibration to a multi-user MIMO process of the base station 804, such as described in operation 1009.

Although FIG. 15 illustrates one example of a method 1500 for UE assisted OTA calibration, various changes may be made to FIG. 15. For example, while shown as a series of steps, various steps in FIG. 15 could overlap, occur in parallel, occur in a different order, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method of a base station, the method comprising:
receiving, from a user equipment (UE), a sounding reference signal (SRS) symbol from a user equipment (UE);
estimating, based on the received SRS symbol, an uplink (UL) channel at a full dimensional multiple-input multiple-output (FD-MIMO) base station base band;
receiving, from the UE, an estimate of a downlink (DL) channel; and performing, a joint calibration based on one or more calibration algorithms using channel state information (CSI), wherein the one or more calibration algorithms compute a variation of one or more ratios between the UL channel and the DL channel across multiple transceivers.

2. The method of claim 1, further comprising:
applying, by the base station, results of the joint calibration to a multi-user MIMO process.

3. The method of claim 1, further comprising:
transmitting, to the UE, a channel state information reference signal (CSI-RS) symbol for the estimate of the DL channel.

4. The method of claim 3, wherein the CSI-RS symbol is transmitted and the SRS symbol is received in a single time division duplex (TDD) frame.

5. The method of claim 1, wherein the one or more calibration algorithms identify a variation of one or more ratios between a transmit channel and a receive channel across multiple transceivers of the base station.

6. The method of claim 1, wherein the one or more calibration algorithms comprise a weighted least squares algorithm.

7. The method of claim 1, wherein the joint calibration is performed without a common calibration transceiver and a coupling network.

8. A base station comprising:
a transceiver configured to receive, from a user equipment (UE), a sounding reference signal (SRS) symbol; and
a processor operably connected to the transceiver, the processor configured to estimate, based on the received SRS symbol, an uplink (UL) channel at a full dimensional multiple-input multiple-output (FD-MIMO) base station base band,
wherein the transceiver is further configured to receive, from the UE, an estimate of a downlink (DL) channel, and
wherein the processor is further configured to perform a joint calibration based on one or more calibration algorithms using channel state information (CSI), the one or more calibration algorithms computing a variation of one or more ratios between the UL channel and the DL channel across multiple transceivers.

9. The base station of claim 8, wherein the processor is further configured to apply results of the joint calibration to a multi-user MIMO process.

10. The base station of claim 8, wherein the transceiver is further configured to transmit, to the UE, a channel state information reference signal (CSI-RS) symbol for the estimate of the DL channel.

11. The base station of claim 10, wherein the CSI-RS symbol is transmitted and the SRS symbol is received in a single time division duplex (TDD) frame.

12. The base station of claim 8, wherein the one or more calibration algorithms identify a variation of one or more ratios between a transmit channel and a receive channel across multiple transceivers.

13. The base station of claim 8, wherein the one or more calibration algorithms comprise a weighted least squares algorithm.

14. The base station of claim 8, wherein the processor is further configured to perform the joint calibration without a common calibration transceiver and a coupling network.

15. A non-transitory computer readable medium comprising program code that, when executed by a processor of a device, cause the device to:
receive, from a user equipment (UE), a sounding reference signal (SRS) symbol;
estimate, based on the received SRS symbol, an uplink (UL) channel to at a full dimensional multiple-input multiple-output (FD-MIMO) base station base band;
receive, from the UE, an estimate of a downlink (DL) channel; and
perform a joint calibration based on one or more calibration algorithms using channel state information (CSI), wherein the one or more calibration algorithms compute a variation of one or more ratios between the UL channel and the DL channel across multiple transceivers.

16. The non-transitory computer readable medium of claim 15, further comprising program code that, when executed by the processor of the device, cause the device to apply results of the joint calibration to a multi-user MIMO process.

17. The non-transitory computer readable medium of claim 15, further comprising program code that, when executed by the processor of the device, cause the device to transmit, to the UE, a channel state information reference signal (CSI-RS) symbol for the estimate of the DL channel.

18. The non-transitory computer readable medium of claim 17, wherein the CSI-RS symbol is transmitted and the SRS symbol is received in a single time division duplex (TDD) frame.

19. The non-transitory computer readable medium of claim 15, wherein the one or more calibration algorithms identify a variation of one or more ratios between a transmit channel and a receive channel across multiple transceivers of a base station.

20. The non-transitory computer readable medium of claim 15, wherein the one or more calibration algorithms comprise a weighted least squares algorithm, and wherein the joint calibration is performed without a common calibration transceiver and a coupling network.

* * * * *